3,537,647
VARIABLE AREA NOZZLES
André Alphonse Médéric Leon Camboulives, Billancourt, and Jean-Claude Lucien Delonge, Moissy-Cramayel, France, assignors to Societe Nationale d'Etude et de Construction de Moteurs d'Aviation, Paris, France, a company of France
Filed Jan. 16, 1969, Ser. No. 791,716
Claims priority, application France, Jan. 19, 1968, 136,774
Int. Cl. B64c 15/06
U.S. Cl. 239—265.39                                6 Claims

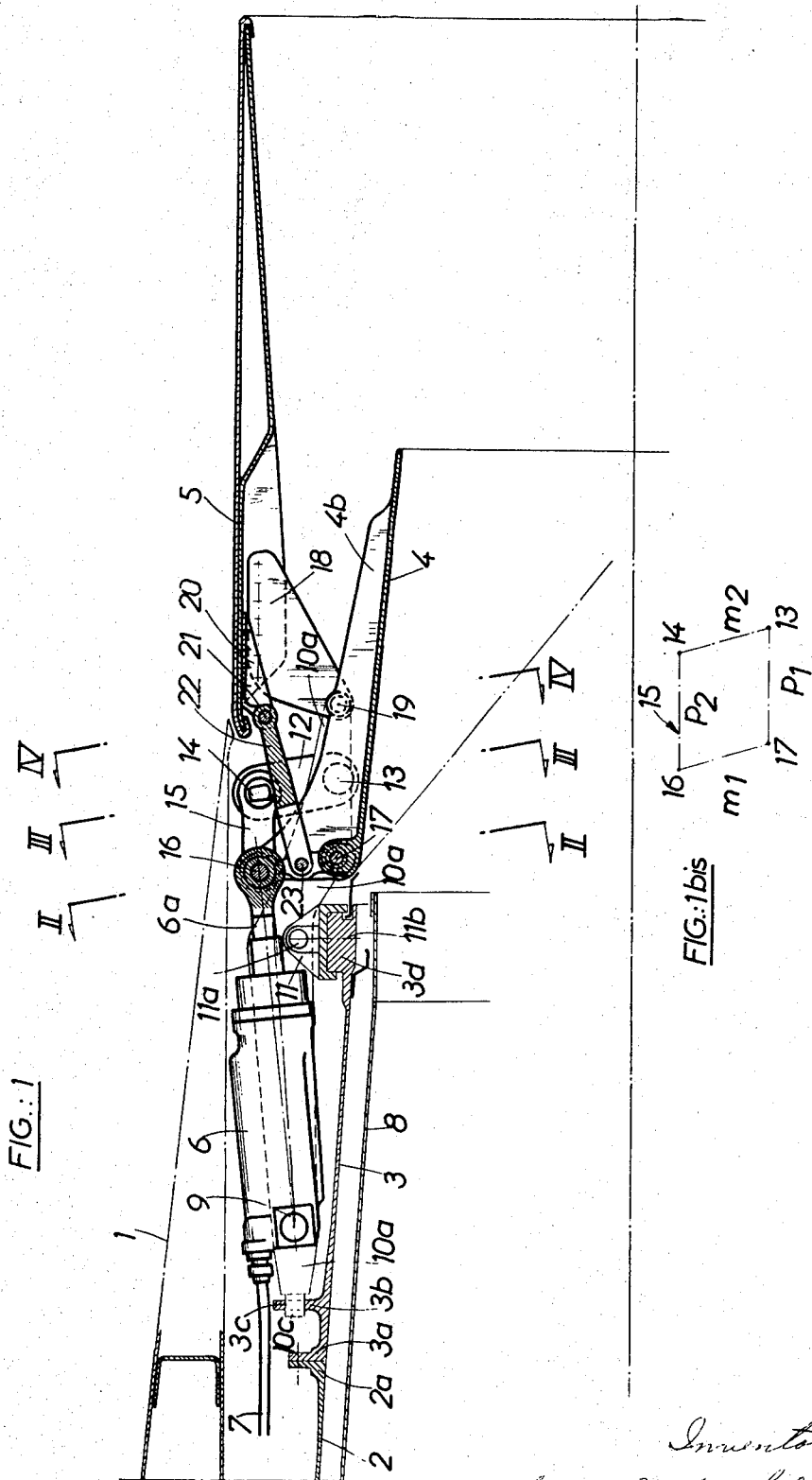

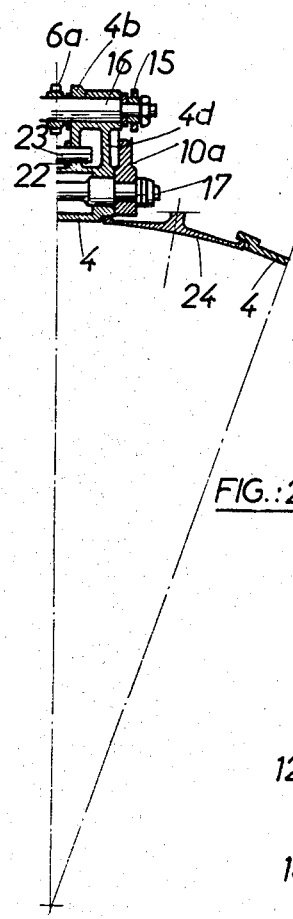
FIG.:2
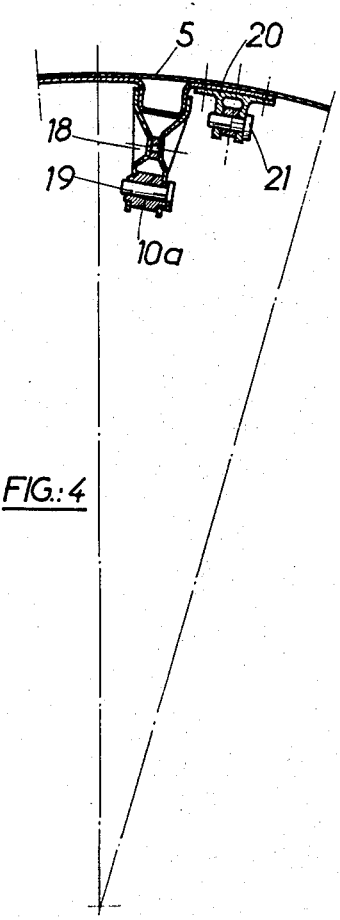
FIG.:4
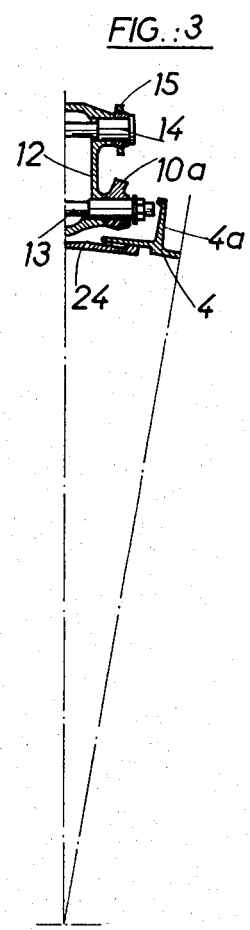
FIG.:3

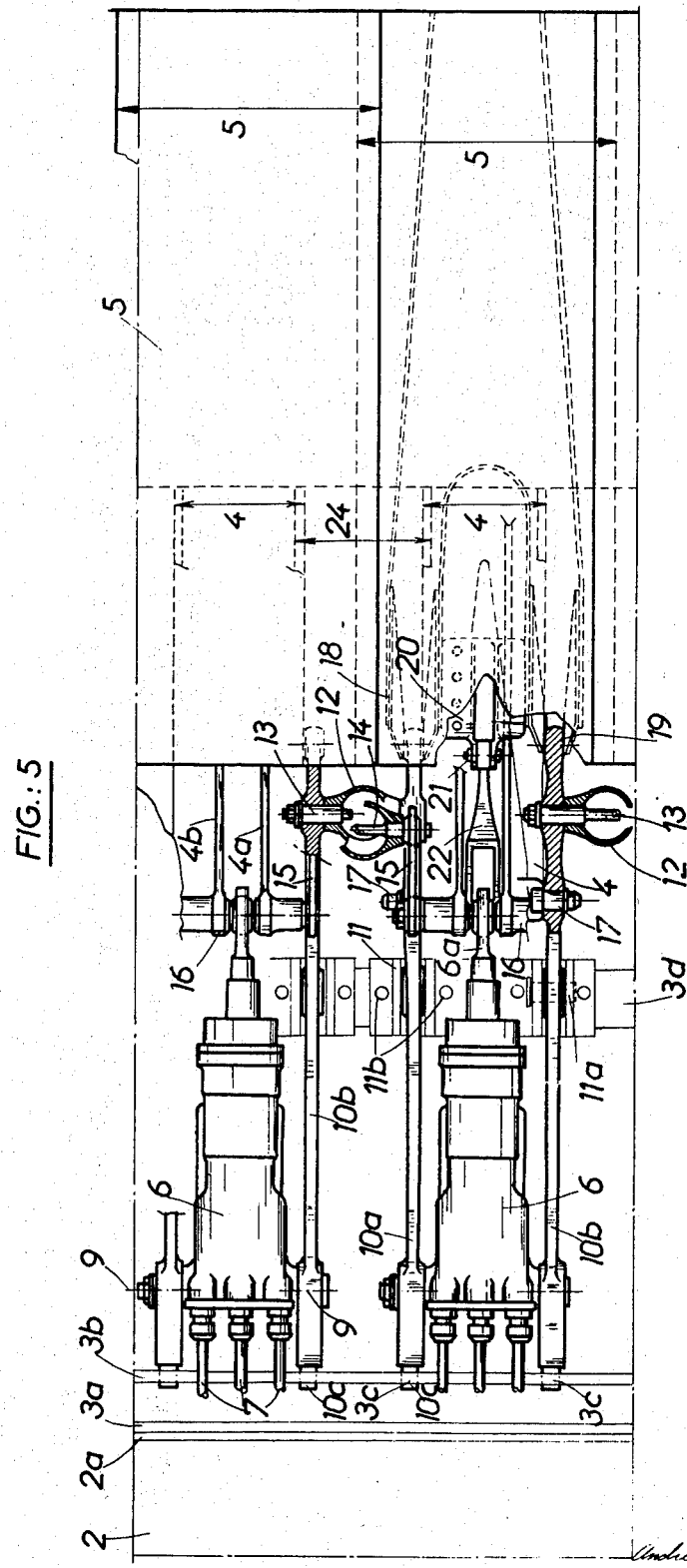

ABSTRACT OF THE DISCLOSURE

This invention relates to a variable area nozzle having a set of controlled flaps disposed circumferentially around a fixed nozzle duct and adapted to pivot under the control of a plurality of control devices to vary the transverse cross-section of the nozzle duct, together with intermediate levers articulated to the flaps in alternating disposition therewith to correlate the flap movements, and is characterised by the provision of a mounting means for the flap and lever assembly including side plates supporting the main flap and lever articulations in such a manner that stresses, introduced into the nozzle duct by virtue of correlating the flap movements, are minimised.

---

This invention relates to a variable area nozzle of the kind having at least one set of controlled flaps articulated at their upstream zones about axes disposed substantially tangentially with respect to the nozzle and distributed peripherally around the downstream part of a fixed nozzle duct, the flaps being designed to pivot, under the control of a plurality of control devices, about their respective axes of articulation, in order to vary the transverse cross-section of the nozzle.

The invention relates, in particular, to a nozzle of this kind which is equipped with a synchronising device comprising a group of intermediate levers separate from the control devices and respectively located each between two successive controlled flaps, each of said levers being connected through the medium of articulated links to the two flaps which bound it and itself being articulated about a substantially tangential axis.

The assembly of the controlled flaps and the elements which make up the synchronising device constitutes a serrated kinematic chain closed around the nozzle, which forces each of the flaps to adopt a mean position common to the flap assembly.

Nozzles equipped in this way have the advantage, as those skilled in the art will be well aware, of retaining a circular and concentric transverse section throughout all phases of operation, this even in the event of any dissymmetry in the control of the various flaps.

The aforestated advantage is, however, offset by a serious drawback. In other words, in the event of dissymmetry in the flap controls, mechanical stresses and in particular flectural and torsional stresses are developed, in particular at the level of the axes of articulation of the flaps and those of the intermediate levers. These stresses, which can become very high, are transmitted to the fixed duct of the nozzle, itself already highly stressed by thermal loading. If undesired distortion of the fixed duct is to be avoided, it is necessary to design it with an excessively large safety factor so that it can withstand the extra stresses due to the synchronising arrangements. The result of this is an increase in weight and in bulk, both factors being disadvantageous from the technical and economic points of view.

It is the object of the invention to improve nozzles of the aforementioned kind equipped with synchronised flap control, in order to a large extent to eliminate the drawbacks hereinbefore referred to.

To this end, in a nozzle equipped with synchronised variable flaps, in accordance with the invention, the flap spindles and those of the intermediate levers are carried by a system of longitudinal side plates distributed circumferentially about the nozzle axis and themselves carried by the fixed duct of the nozzle and extending downstream towards the downstream extremity of said duct, the geometric figure described, on the one hand by the respective points of articulation of one and the same link to a control flap and to an intermediate lever and on the other hand by the respective intersections with one of said side plates of the spindles of said flap and said lever, being substantially a parallelogram which is capable of deforming during variations in section of the nozzle, whilst nevertheless maintaining one fixed side which is constituted by a straightline section extending within said side plate and joining said intersections.

It will become apparent from the enusing explanation that an arrangement of this kind makes it possible, in particular, very substantially to reduce the magnitude of the torsional or flexural stresses, these being the stresses which most severely jeopardise the stability of the fixed duct of the nozzle, so that in practice all that is left are tensile and compressive stresses, which are easy to cope with without having to excessively reinforce the duct.

In accordance with one feature of the invention, the straight-line section which has been mentioned is substantially parallel to the axis of the nozzle, so that the links are constrained to remain parallel to said axis at all times, whatever the flap opening.

In accordance with another feature of the invention, the side plates are each articulated, at their intermediate portion, to a structure carried by the fixed duct of the nozzle, and can slide through the medium of their upstream extremities in orifices formed in another structure fixed to said duct. This method of fixing provides a simple way of taking account of the expansion of the side plates during operation.

In accordance with another feature of the invention, the points of articulation, to one and the same flap, of two links which are respectively articulated to two consecutive intermediate levers and which surrounds said flap, are joined with one another by a spindle substantially parallel to the pivot spindle of the flap, said spindle being connected to the individual flap control device.

The invention is equally applicable to a composite nozzle having two groups of controlled flaps. In the case where the two groups are independently controlled, they are also equipped with independent synchronising devices. On the other hand, a single synchronising device is all that is needed in the case where the flaps of one of the groups derive their movement from those of the other.

In the latter case and in accordance with a further feature of the invention, the flaps of the second group are articulated about axes substantially tangential in disposition and likewise located in longitudinal side plates.

In accordance with yet another feature of the invention, applicable to the case of a nozzle having two groups of flaps, the flaps of the two groups are installed in such a fashion that a flap of the first group and a flap of the second group are in line and, together with an individual control device associated with one of them, lie in the same axial plane of symmetry. This arrangement provides a simple way of ensuring symmetry in the distribution of the forces exerted on the flaps and in the stresses produced in the flap-supporting structure and the synchronising elements.

The invention may be carried into practice in various ways, but a preferred practical embodiment thereof will now be described by way of example with reference to the accompanying drawing, in which:

FIG. 1 is a longitudinal top half-section through a nozzle in accordance with the invention having two groups of synchronised flaps, the section having been taken in a plane passing through the axis of the nozzle and constituting a plane of symmetry with respect to both a flap of one of the groups and a flap of the other;

FIG. 1b is a simplified diagram showing certain geometric details of the synchronising device;

FIGS. 2, 3 and 4 are partial sectional views of the nozzle, on lines II—II, III—III and IV—IV respectively of FIG. 1; and FIG. 5 is a developed view, partly cut away, of the nozzle.

In FIGS. 1 to 5, the reference 1 indicates the nacelle structure of an aircraft, inside which there is installed the nozzle system 2 of a jet engine. This nozzle system possesses a flange 2a to which there can be bolted a flange 3a belonging to a fixed nozzle duct 3. This fixed duct extends downstream in the form of mobile flaps 4, 24, also referred to as internal or hot flaps, whilst the nacelle extends downstream in the form of mobile flaps 5, also referred to as external flaps or cold flaps. The hot flaps and the cold flaps are articulated, at their upstream ends, about spindles which are disposed substantially tangentially with respect to the duct 3 and uniformly distributed circumferentially around and in the neighbourhood of the downstream part of such duct 3, the flaps being able to pivot about their respective spindles under the control of jacks 6 each having a piston rod 6a. As FIG. 5 shows, a jack 6 is associated with each of the flaps 4, which hereinafter will be referred to as controlled flaps. The flaps 24, which are slave flaps and are located between the flaps 4, are applied against the internal edges of the neighbouring controlled flaps 4 by the jet thrust, during operation.

The reference 7 designates the oil delivery and return lines for the hydraulic jacks. The annular space between the nacelle 1 and the nozzle system 2, 3 may pass an airflow which will serve in particular to cool the flaps and their control elements and constitutes in the conventional way a divergent "fluid" wall downstream of the exit section of the flaps 4.

The arrangement described hereinbefore, as those skilled in the art will realise, is particularly advantageous where the exit section of the nozzle is to be varied within wide limits, for example in order to enable the nozzle to operate both in the subsonic and supersonic ranges. The internal group of hot flaps directs the propulsive thrust. Whilst the external group of cold flaps ensures in all cases that the external surfaces have a clean aerodynamic profile. The latter flaps also have a very small convergence (that is to say a very small variation in their transverse dimensions considered in the direction of displacement of the surrounding fluid flow) so that the thrust loss, often referred to as the "rear end drag," due to an unclean rear profile of the nozzle, is reduced to the maximum possible extent.

The nozzle system 2, 3 can be provided, if desired, with a protective liner 8, outside which a cooling airflow can likewise circulate. The fixed duct 3 has a circular flange 3b in which there is formed a series of substantially cylindrical orifices 3c. Longitudinal side plates 10a, 10b, each presenting at the upstream extremity a cylindrical boss 10c designed to locate in one of the orifices 3c, are provided. These side plates, which enclose each of the successive jacks 6, are each articulated about a spindle 11a in a fixed yoke 11, through the medium of bolts 11b, to the reinforced downstream end 3d of the fixed duct 3. Each of the jacks 6 is articulated at the point 9 to the two surrounding side plates. This method of fixing the side plates, as those skilled in the art will appreciate, makes it possible to compensate for their expansion during operation.

Each of the controlled internal flaps 4 has four longitudinal ribs 4a, 4b 4c, 4d (the central ribs 4a, 4b, longer than the others, are visible in FIG. 5 while a lateral rib 4d is visible in FIG. 2), containing locations designed to receive three substantially tangential spindles, namely a bottom spindle 17 which enables the flap 4 to articulate in relation to the side plates 10a, 10b surrounding it, a top spindle 16 doing duty as the control spindle of the flap and receiving the extremity of the piston rod 6a of the control jack 6, and, finally, an intermediate spindle 23 to which there is articulated a link 22 which is in turn articulated at its other end to a control spindle 21 fixed to an external flap 5.

Each of the external flaps 5 comprises, located symmetrically to either side of its plane of symmetry, two structures 18 acting as a yoke for a pivot spindle 19 carried in bearings at the downstream end of the side plates 10a, 10b. Each of the flaps 5 likewise comprises a central yoke 20 which carries the control spindle 21.

It will be seen that the pivoting of an internal flap 4 about the spindle 17, following the action of the piston rod 6a of the jack 6 articulated to the spindle 16, at the same time produces pivoting of an external flap 5 about its spindle 19, through the medium of the link 22. As FIG. 5 shows, the controlled flaps 4 and 5 are located in-line and have the same axial plane of symmetry as the piston rod 6a of the jack and the transmission link 22. By reason of the in-line arrangement of the jack, the internal flap and the external flap corresponding thereto, the forces applied by the jacks to the flaps are normally symmetrical, the two side plates 10a, 10b which surround a flap thus being similarly loaded.

The synchronising device which will now be described relates not only to the group of controlled hot flaps but equally to the group of controlled cold flaps, this by virtue of the kinematic link between these two groups of flaps.

This synchronising device essentially comprises a series of intermediate levers 12 each located between two successive control flaps 4 and equipped in each case with two spindles 13, 14 disposed substantially tangentially, namely a bottom spindle 13, whose two ends are carried respectively in a side plate 10a and a side plate 10b, and an external spindle 14 the two ends of which are respectively connected by links 15 to the two respective opposite ends of operating spindles 16 of the contiguous flaps 4 which surround said lever. The lever 12 has a hollow structure, enlarged at the centre, in order to withstand flexural and/or torsional forces. Preferably, and as FIG. 3 shows, the point of application, at any intermediate lever 12, of the force exerted on one end of the spindle 14 by the link 15, and the point of application of the reaction produced by a side plate such as 10a located at the end disposed at the same side of the spindle 13, will be in the same plane, and indeed one which contains the nozzle axis. It is clear that the slave flaps 24 and the intermediate levers 12 which take up the space between two controlled flaps 4, are designed in such a way that they do not interfere with one another in use.

In this way, there is produced about the nozzle a closed serrated chain, the links of which comprise the spindle 16 of a hot flap, a connecting link 15, the external spindle 14 of an intermediate lever 12, another link 15, another spindle, and so on.

Projected on to an axial plane containing a link 15, one "link" in the "chain" will take the form of a deformable parallelogram 12, 14, 16, 17, the bottom side 13–17 of which is constituted by a fixed straight-line section contained in a side plate such as 10a, and the top side of which, constituted by a link 15, remains parallel at all times to the bottom side 13–17, throughout its displacement. If the bottom side 13–17 is itself parallel to the axis of the nozzle, it will be clear that the links 15 will likewise remain parallel thereto, and, consequently, whatever the nozzle opening, will constitute the generatrices of a cylinder of revolution about said axis.

The FIG. 1b schematically illustrates the deformable parallelogram of which mention has just been made.

The geometric features of the "link" in the "chain," which can be seen in this parallelogram system, are as follows:

(a) the distance $m_1$ between the spindles 16 and 17 associated with a hot flap, is equal to the distance $m_2$ between the two spindles 13 and 14 associated with an intermediate lever 12;

(b) the distance $p_1$ between the pivot pin 17 of the flap 4 and the pivot pin 13 of the intermediate lever 12 is equal to the distance $p_2$ between the operating spindle 16 of the flap 4 and the connecting spindle 14 associated with the lever 12;

(c) the links 15 connect together the spindles 16 and 14 and for a given cross-section of opening, determine the generatrices of one and the same cylinder of revolution considered about the nozzle axis.

In the event of abnormal operation, for example when one or more jacks apply to their associated flaps forces which differ from the forces applied by the other jacks, one or more of the spindles 14, belonging to the intermediate levers situated between two jacks extension of whose rods 6a tends to differ, will tend to adopt a skewed position. However, they are prevented from following this tendency, bearing in mind the inherent rigidity of the intermediate levers 12, by the way in which the spindles 13 are carried in the side plates 10a, 10b. The various levers 12 thus enable the extensions of the piston rods of the jacks to be equalised, so that these rods take up a common mean position. The stresses arising out of the dissymmetry in the jack thrusts are absorbed by the system of side plates 10a, 10b, without in any way affecting the shape of the nozzle duct 3 upon which said side plates are assembled, this primarily because of the method of assembly, hereinbefore described, which has been chosen in order that said side plates can achieve a compensating effect. The stresses will alternate between tensile stresses in one of the side plates and compressive stresses in the next. The fact that these stresses are directed in opposite directions is a minor drawback since the distortion they produce in the side plates can be neglected. On the other hand, it will be observed that there is virtually a total absence of torsional or flexural stresses, these being much more difficult to absorb.

The various spindles or pins 17, 13, 19 are located as close as possible to the axes of articulation 11 of the side plates 10a, 10b to the fixed nozzle duct, in order to reduce as far as possible the length of the lever arms 11–17 for example. In this way, a further reduction in the reactions in the side plates and the fixed nozzle duct is achieved.

The nozzle designed in the above-described manner has numerous advantages. Whatever the size of its exit cross-section, said section remains circular and concentric throughout, so that no unintended or undesirable change in the direction or intensity of the thrust factor is produced, this even in the event of dissymmetry in the system used to control the flaps.

The nozzle is stable. In other words, should for example the forces produced by certain jacks tend to open the flaps, restoring forces exerted by the other jacks, and transmitted through the synchronizing arrangements, will immediately come into effect and tend to oppose such opening movement.

For similar reasons, the nozzle is equally insensitive to expansion effects.

The assembly constituted by the jack control system for the hot flaps, the system controlling the cold flaps from the hot flaps, and the synchronizing device associated with both groups of flaps, is produced in the form of a very simple mechanism which reduces to a very low value the friction losses which occur. The force which the jacks have to produce in order to operate the flaps is therefore small so that these jacks can be small in size, and, consequently, the size and weight of the overall installation is reduced. Moreover, the oil volume supplied to the jacks need not be very large so that very short nozzle opening and closing times are achieved.

Any jack 6, the hot flap which it controls and the cold flap 5 controlled by the hot flap, are all in line so that the side plates 10a, 10b, are loaded in a symmetrical fashion, neglecting the stresses due to the synchronising forces and the effect of which is, because of the arrangements used in accordance with the invention, more or less negligible. The jack pivot pin and that of the hot flap remain substantially parallel with one another. The result is that the piston rod of the jack always operates substantially axially, and there is no transverse reaction other than the negligible one which may arise out of friction effects.

Finally, the nozzle is not bulky and its shape adapts easily to that of the aircraft in which it is installed, reducing rear end drag.

It will be appreciated that the above-described embodiment may be modified in various ways within the scope of the invention, as defined by the appended claims.

1. A variable area nozzle comprising:
a fixed nozzle duct;
a group of controlled flaps distributed circumferentially about the downstream portion of the nozzle duct;
pivot spindles about which the controlled flaps are adapted to pivot about axes disposed substantially tangentially with respect to the nozzle duct in order to vary the transverse cross-section of said nozzle;
a plurality of control devices for controlling pivotal movement of the respective flaps;
a group of intermediate levers separate from the control devices and respectively articulated to the controlled flaps in alternating disposition therewith;
spindles about which the intermediate levers are adapted to pivot about axes disposed substantially tangentially with respect to the nozzle;
a system of longitudinal side plates distributed circumferentially about the nozzle duct and carried thereby; and
means whereby the flap spindles and the intermediate lever spindles are so carried by the side plates that the geometric figure described, on the one hand by the respective points of articulation of one and the same link to a control flap and to an intermediate lever and on the other hand by the respective intersections with one of said side plates of the spindles of said flap and said lever, is substantially a parallelogram which is capable of deforming during variations in section of the nozzle, whilst nevertheless maintaining one fixed side which is constiuted by a straight-line section extending within sad plate and joning said intersections.

2. A nozzle as claimed in claim 1, wherein said straight-line section is substantially parallel to the nozzle axis so that the links are constrained to remain parallel with said axis whatever the opening of the flaps.

3. A nozzle as claimed in claim 1, further including two distinct structures fixedly carried by the nozzle duct, the upstream structure of said two structures having orifices adapted slidingly to receive the upstream extremities of the side plates, and means articulating the intermediate portions of said side plates to the downstream structure of said two structures.

4. A nozzle as claimed in claim 1, further including two links articulated to each controlled flap and respectively to one of the two adjacent intermediate levers, a further spindle extending parallel to the flap pivot spindle and joining the two points of articulation of said two links to said flap, and means connecting said further spindle to the control device for said flap.

5. A nozzle as claimed in claim 1, further including a second group of flaps which derive their movement from the flaps of the first group, and tangentially disposed pivot pins carried by the side plates about which the flaps of the second group are adapted to pivot.

6. A nozzle as claimed in claim 1, further including a second group of flaps, wherein a flap of the first group and a flap of the second are located in line and, along with an individual control device associated with one of them, have the same axial plane of symmetry.

References Cited
UNITED STATES PATENTS

| | | | |
|---|---|---|---|
| 2,990,029 | 6/1961 | Keen | 239—265.39 |
| 3,004,385 | 10/1961 | Spears et al. | 239—265.41 |
| 3,426,974 | 1/1969 | Pendoley et al. | 239—265.39 |

M. HENSON WOOD, JR., Primary Examiner

JOHN J. LOVE, Assistant Examiner

U.S. Cl. X.R.

239—265.33